Jan. 17, 1933.    J. E. MITCHELL ET AL    1,894,699
BEARING AND MOUNTING THEREFOR
Original Filed Aug. 8, 1927
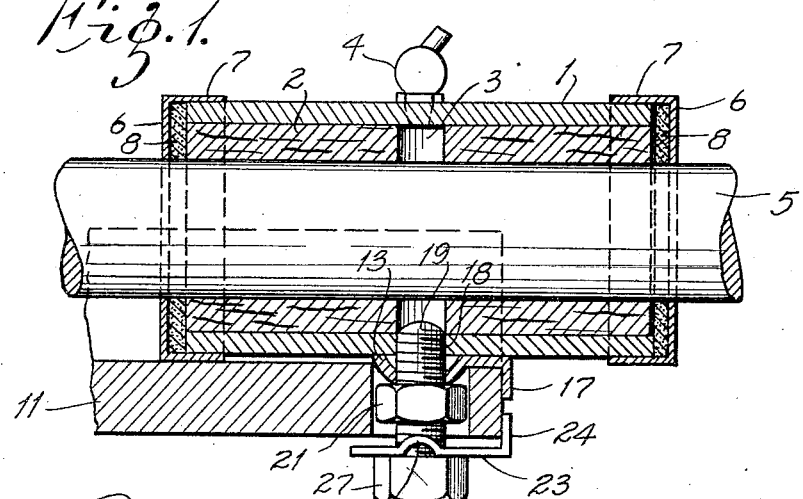
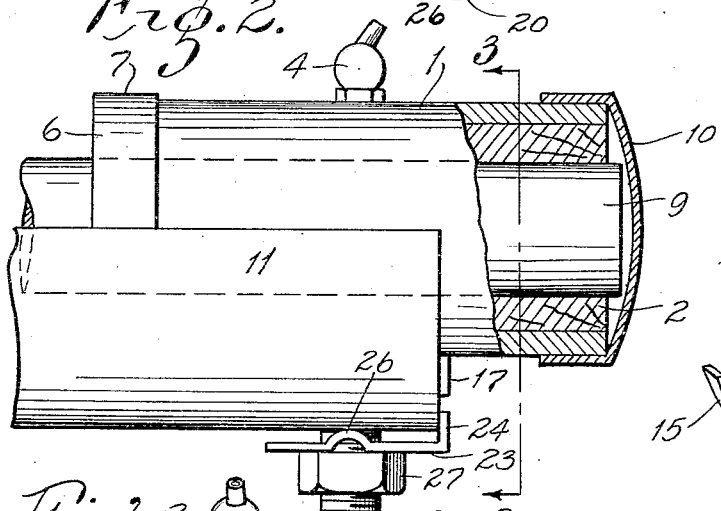
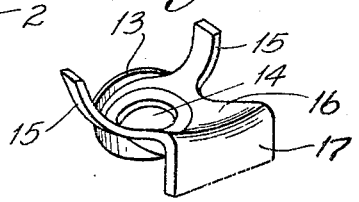
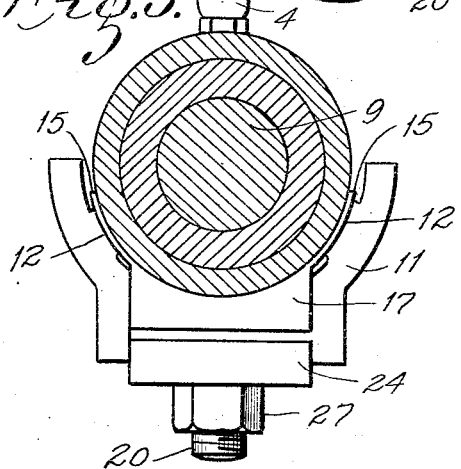
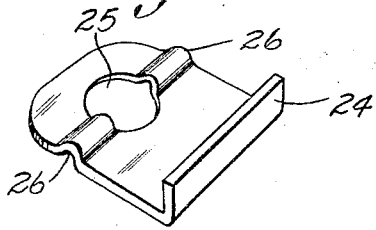
INVENTORS
JOHN E. MITCHELL
ORVILLE MITCHELL
BY Bruce S. Elliott
ATTORNEY Patented Jan. 17, 1933

1,894,699

UNITED STATES PATENT OFFICE

JOHN E. MITCHELL AND ORVILLE MITCHELL, OF DALLAS, TEXAS

BEARING AND MOUNTING THEREFOR

Refiling of abandoned application Serial No. 211,318, filed August 8, 1927. This application filed January 12, 1931. Serial No. 508,341.

This application is filed as a refile of our abandoned application, Ser. No. 211,318, filed August 8, 1927, for the same invention.

The general object of this invention is to provide a novel bearing embodying in its construction as the bearing element a wood bushing, or wood bushings, preferably the latter. In an application filed August 8, 1927, Ser. No. 211,319, in the name of Orville Mitchell, one of the joint inventors herein, there is set forth and claimed a bearing comprising, as essential elements, a casing formed of a section of tube having a wood bushing, or wood bushings, enclosed therein. The present invention is concerned with the same type of bearing, but embodies certain additional novel features entering into the construction of the complete bearing.

While not limited to any particular application, the present invention is designed more especially for use in cotton cleaning machines of the type disclosed in various prior patents of John E. Mitchell, the other joint inventor herein, and the main objects intended to be promoted by the present bearing are to enable the various shafts of the machine to be supported in proper alinement and to dispense with the necessity of the frequent lubrication of the bearings which is necessary with the form of bearing previously used.

Such prior bearings were of cast iron and lined with babbitt, or similar material, which served as the bearing element. The bearings of the machine referred to are detachably mounted on the frame of the machine, and with the prior form of bearing it was found exceedingly difficult to mount the bearings on the supports provided for them on the frame without, in many cases, producing a slight mis-alinement of the shafts, or causing the bearings to bind on the shafts, in securing the bearings in position on the frame, with a resultant increase of friction in the operation of the machine. This was due to the fact that as the supports are cast on the frame of the machine, and the bearing secured to the supports, the bearings would not always properly aline with the shaft, due to inaccuracies in the casting, and the bearings were not mounted on their supports in a manner to permit them to be self-adjusting to compensate for slight misalinements between the bearing support and the shaft. Further, in many cases it was found necessary to lubricate the bearings of the machine as often as twice a day, and as, in the particular machine referred to, there are more than twenty bearings on each machine, quite a large amount of time and labor had to be expended each day in order to maintain the machines properly lubricated.

The present invention overcomes the objections incident to the use of cast iron bearings as previously constructed and mounted in that provision is made, in connection with the use of wood bushings, for storing a quantity of lubricant within the bearing, by reason of the construction thereof, which will obviate the necessity of lubricating the bearings except at relatively long intervals of time, say, several months, and in that, further, the bearing is mounted in such manner as to be self-compensating with relation to the shaft and the support for the bearing, so that when placed on the shaft and secured in position on its support, the bearing will assume a correct position in parallelism with the shaft, even though the latter may be slightly mis-alined, or the bearing be thrown out of alinement with the shaft in the operation of rigidly securing the bearing on its support. The present invention, therefore, is directed to a novel bearing comprising a casing formed of a section of tube having wood bushings forced therein at either end, each bushing terminating short of the center of the casing to provide a central space for the reception of lubricant, means for supplying lubricant to the interior of the casing, and novel means for mounting the bearing in a self-compensating manner on a support. In addition, the invention is concerned with a bearing of the character described provided with novel means for excluding dust from the interior of the bearings.

The invention is illustrated in the accompanying drawing, in which—

Fig. 1 is a longitudinal sectional view of our improved bearing, shown as mounted on a support;

Fig. 2 is a similar view showing the bearing having one end entirely closed by a dust cap;

Fig. 3 is a cross-section on the line 3—3 of Fig. 2;

Fig. 4 is a perspective view of a novel saddle for mounting the bearing in its support in a manner to permit of a turning movement in a vertical plane of said bearing; and Fig. 5 is a perspective view of an improved form of washer, which is also adapted to have a turning movement to prevent drawing the bearing from a true position when the bolt holding the bearing on its support is screwed home.

Referring now to the drawing, the numeral 1 indicates a casing which is tubular in form and made by cutting a section from a cold-drawn steel tube. Such tubes, and consequently the casings made therefrom, are true within a few thousandths of an inch as to both their outside and inside diameters. The bearing element proper consists of two wood bushings 2 which are tubular in form of slightly larger diameter than the bore of the casing 1, so that when forced into the same at opposite ends, they will be securely held in position by frictional engagement with the wall of the casing. The total length of these bushings is less than the length of the casing 1, whereby when placed in position in the casing, as shown in Fig. 1, a central chamber 3 is provided for the reception of lubricant. Lubricant is supplied to this chamber through the medium of a grease valve 4, a well known type of pressure gun being used for forcing the lubricant through the valve 4. The valve 4 is of the check valve type, permitting lubricant to pass through the same to the chamber 3, but preventing escape of the lubricant from the chamber through the valve. By the use of a tube section as the casing for our bearing, we are enabled to mount the valve 4 on the bearing in a very simple and economical manner, the operations consisting in punching a hole in the center of the casing 1, then tapping, or screw-threading, this hole, and finally, screwing the valve 4 into position. The numeral 5 indicates a shaft which extends through the bearing, being mounted for rotation in the bushings 2. In order to prevent access of dust to the bearing, we mount on each end of the casing 1 a dust cap 6. Each of these dust caps is made of pressed steel and provided with a circular flange 7 which fits snugly over the end of the tubular steel casing. Mounted within each dust cap to bear against the end of the casing 1 and the end of the bushing 2 is a felt washer 8. Both the washer 8 and each of the dust caps 6 is centrally apertured to permit the shaft 5 to pass through, as will be understood. In the form of dust cap shown in Fig. 1, the felt washer 8 really acts as the medium for preventing access of dust to the bearing, each of the caps 6 acting as a retaining means or holder for the washer, which latter snugly embraces the shaft. In Fig. 2, we have illustrated a bearing which supports the end of a shaft 9, and here dust cap 10 is imperforate, itself sealing the end of the casing. In this form of dust cap no felt washer is required. The use of dust caps is of special importance in cotton cleaning machines, which are used in cotton gin plants where the air is always full of flying dust.

One of the principal features of our invention relates to the manner of mounting the bearing to permit it to be self-alining, in order to reduce friction and preserve power. With an ordinary bearing, if the rotating shaft should get out of line with the bore of the bearing, it will run under a constant strain, causing excessive friction between the bearing and the shaft and necessitating the use of more power to run the particular machine then would otherwise be required. To render the bearing self-alining, we employ the saddle shown in Fig. 4 and the washer shown in Fig. 5, and the manner in which these elements are employed in mounting the bearing will now be described.

Referring to Figs. 2 and 3, the numeral 11 indicates a support which, as applied to cotton cleaning machines of the type referred to, is cast with the frame and projects outwardly therefrom at each point where a shaft is to be supported. The support 11 is substantially semi-circular, being adapted to receive the lower half of the bearing and having on its interior at opposite sides inwardly projecting portions 12, provided with curved faces on which the bearing rests. Before placing the bearing in its support, we secure to the underside of the bearing the saddle shown in Fig. 4. This saddle comprises a substantially circular body portion 13 having a central aperture 14, upwardly curved relatively narrow members 15 at opposite sides, a curved plate 16 projecting from one side of the body portion 13 at right angles to the plane of the members 15, and a flange 17 projecting downwardly from the end of the plate 16. The casing 1 of the bearing is provided centrally of its length on its lower side with a screwthreaded opening 18 which is adapted to receive the screwthreaded end 19 of a bolt 20 having thereon a fixed collar 21. In securing the saddle in position, it is applied to the underside of the casing 1 with its aperture 14 alining with the aperture 18 and with the members 15 embracing the casing on opposite sides of the aperture 18. The bolt 20 is then inserted through the aperture 14 and screwed into the aperture 18 of the casing 1 until the collar 21 engages the bottom of the body portion 13 of the saddle, thereby securely binding the saddle in position on the casing. The bottom of the support 11 is apertured, as indicated at 22, to receive the outer end portion of the bolt 20 which is inserted through said aperture when the bearing is placed in position on the support 11. With the bearing in position as described above, the flange 17 of the saddle will project over and engage the end of the support 11, as clearly shown in the first three figures of the drawing. Having inserted the bolt 20 through the aperture 22 in the bearing 11, the washer shown in Fig. 5 is next applied to the lower end of the bolt outside of the bearing. This washer comprises a metal plate 23 having at one end an up-turned flange 24 and provided toward its opposite end with an aperture 25 and a rib 26, which is preferably formed by pressing up the body of the metal, as shown. The rib 26 is intersected centrally by the aperture 25 so that a portion of said rib lies on each side of said aperture. The washer is applied by inserting the aperture 25 over the lower end of the bolt 20 and then applying a nut 27 to said bolt, which nut is screwed upward on the bolt until the rib 26 engages the underside of the support 11. In this position, the up-turned flange 24 will extend over and engage the outer end of the support 11 at the bottom thereof.

It will now be seen that when in position on the support 11, the members 15 constitute the actual points of contact between the bearing and the support, and these members being relatively narrow, permit the bearing to swivel on the support to accommodate itself to the position of the shaft 5. This swiveling movement of the bearing, however, would contribute only partially toward making the bearing self-alining if the securing nut 27 were screwed upward directly into contact with the bottom of the support 11, as was formerly the case. It will be seen, however, that by interposing the washer shown in Fig. 5 between the nut and the bottom of the bearing, the rib 26 likewise provides a swivel between the washer and the bottom of the support. Formerly, when the nut was screwed home, the bearing would frequently be forced out of proper alinement by the shaft by reason of the fact that the nut 27 would necessarily be forced into flush engagement with the bottom of the support and the plane of the bottom of the support would frequently be out of line with the line of the shaft. With the use of our improved washer, however, the nut can be screwed home with the necessary tightness to hold the bearing securely in position and the washer will swivel on the rib 26 so that the flat face of the washer will aline with the axis of the shaft, and the bearing will automatically aline itself with the shaft as it is secured in position. When mounted on its support, the swivels of the saddle and the rib of the washer will, of course, be in substantial alinement.

While we have shown our invention as applied to a cotton cleaning machine, and have illustrated and described the embodiment thereof which we actually employ, we wish it understood that the invention is not limited either to its application to cotton cleaning machines, or to the precise form and arrangement of parts shown, but that various modifications of the form, construction, and arrangement of parts could be made without departing from the spirit of our invention.

We claim:—

1. In combination with a support, a tubular bearing provided on its underside with swivel members adapted to rest on said support, and means for securing said bearing in position on the support comprising a washer having a swivel elevated above the plane of the washer centrally thereof and engaging the underside of said support.

2. In combination with a support, a tubular bearing having a member secured on the bottom side thereof providing swivels for resting on said support, a bolt projecting downwardly from said bearing through said support and having an outer screw-threaded end, a washer loosely mounted on said bolt and having on its upper side a rib adapted to engage and swivel on the bottom side of said support, and a nut applied to said bolt and securing the washer firmly against said support.

3. In combination with a support, a tubular bearing having a saddle mounted on its underside and providing swivel members embracing opposite sides of the casing and a flanged member for engaging the end of said support, a bolt securing said saddle on the bearing and having an outer screwthreaded end projecting through the latter, a washer mounted on the projecting end portion of said bolt and provided with a rib adapted to swivel on the underside of said support and with an upturned flange for engaging the end of said support, and a nut applied to the projecting end of said bolt for securing the washer in engagement with the bottom of said support.

4. In combination with a bearing having a saddle mounted thereon provided at opposite sides with relatively narrow curved members forming swivels, a support on which said swivels rest, a washer having a rib engaging the underside of said support and adapted to swivel thereon in alinement with the swivels of said saddle, a bolt secured at one end in said bearing and extending through said saddle, support and washer, and a nut on said bolt for holding said saddle and washer in engagement with the opposite sides of said support.

5. A saddle for use in supporting bearings comprising an apertured body portion having laterally-extending relatively narrow members located in the same plane on opposite sides of the median line of said saddle, and designed to afford swivels on which a bearing provided with said saddle may rock on its support.

6. A saddle for use in supporting a bearing comprising an apertured body portion having laterally-extending relatively narrow curved members located in the same plane on opposite sides of the median line of said saddle and designed to afford swivels on which a bearing provided with said saddle may rock on its support, and a flange projecting in the opposite direction to said narrow members at a distance from said body portion.

In testimony whereof, we have hereunto set our hands.

JOHN E. MITCHELL.
ORVILLE MITCHELL.